United States Patent
Anand et al.

(10) Patent No.: US 10,841,211 B2
(45) Date of Patent: Nov. 17, 2020

(54) END POINT MAPPING SERVICE TO ASSIST TRANSPORT SEGMENT ROUTING

(71) Applicant: Infinera Corporation, Sunnyvale, CA (US)

(72) Inventors: Madhukar Anand, Fremont, CA (US); Ramesh Subrahmaniam, Fremont, CA (US); Sanjoy Bardhan, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/370,163

(22) Filed: Dec. 6, 2016

(65) Prior Publication Data

US 2017/0324647 A1    Nov. 9, 2017

Related U.S. Application Data

(60) Provisional application No. 62/331,432, filed on May 3, 2016.

(51) Int. Cl.
*H04L 12/717* (2013.01)
*H04L 12/723* (2013.01)
*H04L 12/751* (2013.01)

(52) U.S. Cl.
CPC .............. *H04L 45/42* (2013.01); *H04L 45/02* (2013.01); *H04L 45/507* (2013.01)

(58) Field of Classification Search
CPC ..... H04L 45/00; H04L 45/021; H04L 45/028; H04L 45/50; H04L 45/507; H04L 45/52; H04L 45/54; H04L 45/42; H04L 45/02
See application file for complete search history.

(56) References Cited

U.S. PATENT DOCUMENTS

| | | | |
|---|---|---|---|
| 2007/0030851 A1* | 2/2007 | Sinicrope | H04L 45/00 370/392 |
| 2014/0143428 A1* | 5/2014 | Zheng | H04W 12/08 709/226 |

* cited by examiner

*Primary Examiner* — Khoa Huynh
(74) *Attorney, Agent, or Firm* — David L. Soltz

(57) ABSTRACT

Methods, devices, and systems for mapping transport segment labels to packet network endpoints using a mapping server. In some implementations, an end point address in an edge domain is received from an edge router, a mapping of one of the end point address to a transport segment label is received from a network device, the mapping is stored in a non-transitory memory device, and the mapping is transmitted to the edge router.

19 Claims, 4 Drawing Sheets

END POINT MAPPING SERVICE TO ASSIST TRANSPORT SEGMENT ROUTING

CROSS REFERENCE TO RELATED APPLICATION

This application claims the benefit of U.S. Provisional Patent Application No. 62/331,432, filed May 3, 2016, which is incorporated by reference as if fully set forth.

FIELD OF INVENTION

The invention relates generally to communications networking and more particularly to transport network routing.

BACKGROUND

Segment routing (SR) is a technique for forwarding a packet on a network using source based routing to steer the packet through a series of packet network "segments". Each network segment represents a logical path, topological or service-based, through the network. A packet source, such as a router, switch, trusted server, virtual forwarder running on a hypervisor, or other network node, chooses a forward path for the packet through the network and encodes the path in the packet header as an ordered list of segments, for example, as a stack of labels. In a label-switched network, packets can be encoded with a sequence of entries called a "label stack" (each entry called a "label" or "label stack entry"). The labels are ordered, and each specifies a next hop along a path through a network. When the packet arrives at a router, that router's label can be removed or "popped" from the label stack, and the next label in the stack can used to calculate the next hop. Labels may also specify other actions to be taken at a particular hop. In this manner, the network may transmit packets along a specific forward path through the packet network, other than the normal shortest path that a packet usually takes, and allows the network to enforce packet flow through any topological path and service chain while maintaining a per-flow state only at the packet source. Current SR techniques do not however facilitate specification of particular paths through the transport layer.

SUMMARY

Some embodiments provide a method for mapping transport segment labels to packet network endpoints using a mapping server. An end point address in an edge domain is received from an edge router. A mapping of a transport segment label to the one end point address is received from a network device. The mapping is stored in a non-transitory memory device. If a request for the mapping is received from a device on the packet network, the mapping is transmitted to the device.

The transport segment label can correspond to a transport segment comprising a set of transport links and nodes. The transport segment label can correspond to a transport segment having a particular priority. The transport segment label can correspond to a transport segment having a particular characteristic. The characteristic can include at least one of bandwidth; latency; throughput; reliability; link protection; node protection; or security. The network device can include a packet computation element (PCE) or network controller. The mapping can be transmitted in response to receiving an update request from the one of the at least one edge routers. The mapping can be transmitted in response to receiving information indicating that a routing segment has been added or modified. A network device can be communicated with to receive information regarding at least one transport segment. A network device can be communicated with to receive information regarding at least one link of a transport network.

Some embodiments provide a mapping server for mapping transport segment labels to packet network endpoints. The mapping server includes transceiver circuitry configured to communicate with at least one edge router and receive an end point address in an edge domain from the edge router. The transceiver circuitry is also configured to communicate with at least one network device and to receive a mapping of a transport segment label to the end point addresses. The mapping server also includes memory circuitry configured to store the mapping. The transceiver circuitry is also configured to transmit the mapping to a device on the packet network if a request for the mapping is received from the device.

The transport segment label can correspond to a transport segment comprising a set of transport links and nodes. The transport segment label can correspond to a transport segment having a particular priority. The transport segment label can correspond to a transport segment having a particular characteristic. The characteristic can include at least one of bandwidth; latency; throughput; reliability; link protection; node protection; or security. The network device can include a packet computation element (PCE) or network controller. The transceiver circuitry can transmit the mapping in response to receiving an update request from the one of the at least one edge routers. The transceiver circuitry can transmit the mapping in response to receiving information indicating that a routing segment has been added or modified. The transceiver circuitry can communicate with a network device to receive information regarding at least one transport segment. The transceiver circuitry can communicate with a network device to receive information regarding at least one link of a transport network.

DETAILED DESCRIPTION OF THE PREFERRED EMBODIMENT(S)

Figure 1:
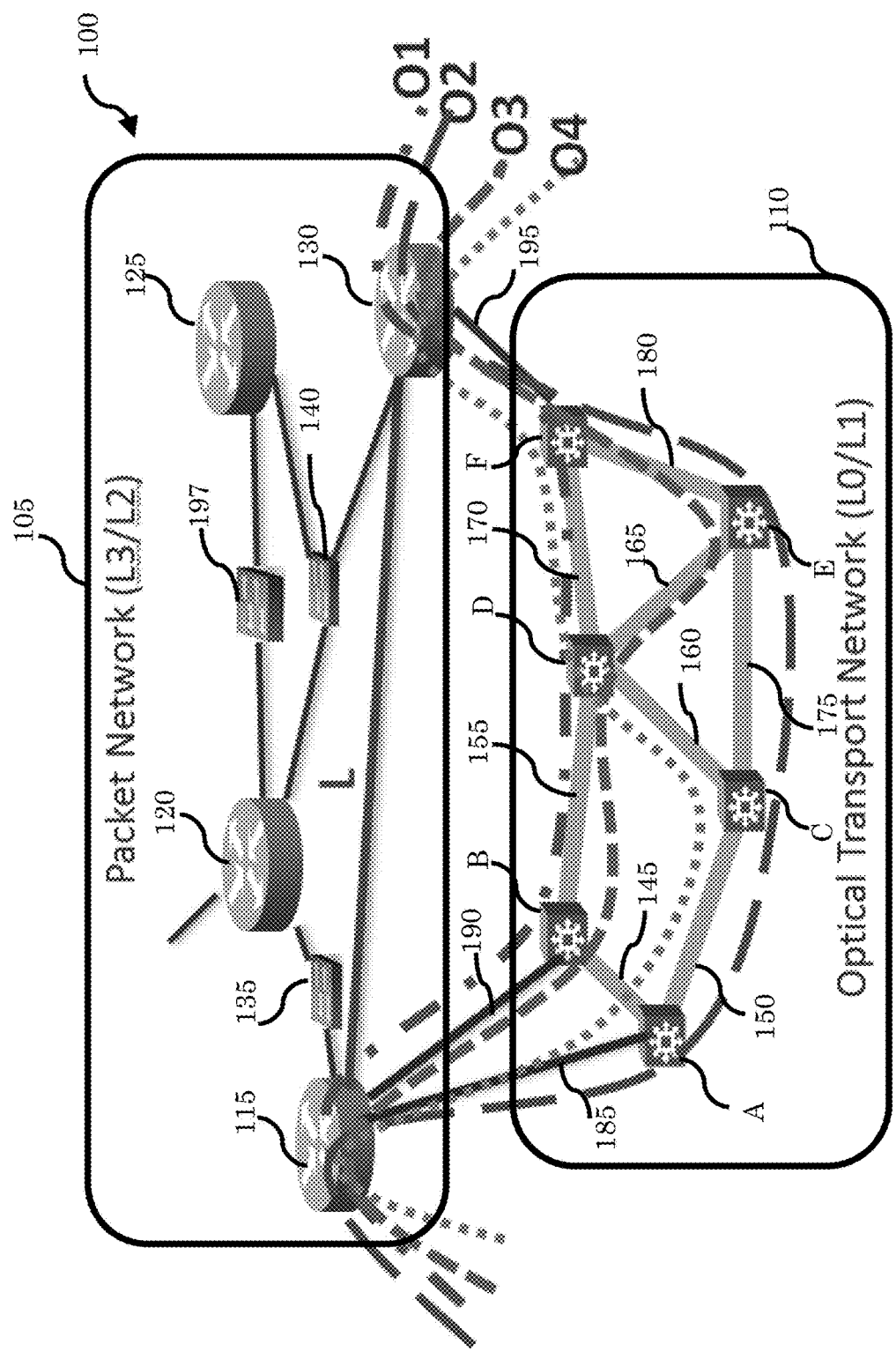
FIG. 1 is a system diagram showing an example topology illustrating aspects of transport segment routing (TSR).

Techniques discussed herein relate to mapping labels to transport network segments. These labels can be included in a label stack to specify label switched packet routing via specific transport links having desired characteristics. Mapping in this context refers generally to associating an item of information with another item of information, and is used herein to describe associating a transport segment label with an endpoint. For example, a mapping server can match transport segment labels to end point location addresses that are usually identified by Internet Protocol (IP) addresses. Labels and transport segments are further described herein.

SR-enabled nodes forward packets using SR forwarding tables and segment identifications (SIDs). A packet enters a network of nodes that are SR enabled via an ingress SR edge node, travels along a segment which includes at least one SR node, and exits the network via an egress SR edge node.

There are different types of segments in SR, including nodal and adjacency segments. A nodal segment identifies a node in the network uniquely, whereas an adjacency segment identifies an interface on a specific SR node, and hence, is locally significant. A segment is typically represented by a Multi-Protocol Label Switching (MPLS) or Internet Protocol version 6 (IPv6) label, which is carried in each packet. As with MPLS label switching, executing an SR instruction can involve PUSH, NEXT (Pop), or CONTINUE (Swap) actions on a router.

Transport segment routing (TSR), as discussed herein, includes a multi-layer control plane that can provide greater automation of network service provisioning and maintenance, can offer integrated packet-optical services, and can allow dynamic binding of transport (e.g., optical) and packet networks when offering those services. Integrated packet-transport services are a set of network services in both the transport and packet portions of the network which can be used meet application-specific constraints such as bandwidth, latency and link and node protection characteristics. Dynamically binding the transport and packet networks can allow cross-connects between the packet and optical networks be set up or torn down in response to network events.

In the SR architecture, MPLS based services such as L3VPN and L2VPN can be set up to tunnel through a SR transport domain. The transport domain thus remains opaque to the SR architecture, and the SR packet layer has no insight into the transport layer topology. While tunneling permits the end points and associated services to be transparent to the routing in the SR domain, the binding between end-points/services and segments is static, and each edge device needs to maintain such static bindings. TSR, in contrast, can include an end point mapping service to assist transport segment routing and facilitate dynamic binding between end-points and segments while mitigating the amount of end-point/service to segment mapping state that needs to be maintained on each edge router.

FIG. 1 is a system diagram showing an example topology 100, which illustrates aspects of TSR. Topology 100 includes a packet network 105 and transport network 110. Packet network 105 can be described as corresponding generally to a network layer of topology 100, and transport network 110 can be described as corresponding generally to a transport layer of topology 100. In some implementations, transport network 110 can also be described as including a physical layer of topology 100.

Packet network 105 includes packet aware routers 115, 120, 125, 130, 135, and 140, which are capable of packet switching. Routers 115, 120, 125, 130, 135, and 140 are in communication within packet network 105 over a number of packet links and nodes. For example, link L connects router 115 with router 130 in the packet domain. In the example of packet network 105, router 115 and router 130 are geographically separated and not directly connected—i.e., link L does not represent a direct or "one-hop" physical connection, but rather, represents a logical connection in the packet domain. At a lower level of abstraction, packets are transported between router 115 and router 130 over transport network 110.

Transport network 110 includes transport nodes A, B, C, D, E and F. It is noted that while transport network 110 is described with respect to optical technology for the sake of illustration, other transport technologies may be used (e.g., wired or radio frequency wireless). Transport nodes A, B, C, D, E and F can include any suitable optical transmission device, such as a fiber-optic repeater, optical receiver/transmitter, optical router, and/or other suitable device for transporting information over transport network 110, and typically do not decode packet headers for routing. Both router 115 and router 130, which do decode packets for routing, are connected to transport network 110, and information can take a number of paths from router 115 to packet aware router 130 through transport network 110.

Routers 115 and 130 are edge devices of the transport network 110 and include circuitry configured to interface the packet network 105 with the transport network 110. Routers 115 and 130 can include, for example, packet-optical gateways (POGs) or packet-transport gateways (e.g., for non-optical transport implementations). Router 115 is in communication with transport node A via transport link 185. Router 115 is also in communication with transport node B via transport link 190. Router 130 is in communication with transport node F via transport link 195. It is noted that router 115 and 130 could be connected to optical nodes A, B, and F via a different kind of link (e.g., non-optical), or routers 115 and/or 130 could be co-located with or could include optical nodes A, B, and F respectively in other implementations.

Transport nodes A, B, C, D, E and F are in communication within transport network 110 over transport links 145, 150, 155, 160, 165, 170, 175, 180, 185, 190, and 195. Transport links 145, 150, 155, 160, 165, 170, 175, 180, 185, 190, and 195 can include any suitable optical medium for transmitting data, such as fiber optic cable. It is noted however that transport links 145, 150, 155, 160, 165, 170, 175, 180, 185, 190, and 195 may include any other suitable transport medium based on the technology of transport network 110 (e.g., electrically conductive cable and/or an air interface).

Viewed from the perspective of packet network 105, packet aware router 115 is only one logical hop away from packet aware router 130, via link L. However packets transmitted from router 115 to router 130 via logical link L are actually transported between router 115 and router 130 over several links of transport network 110. Transport network 110 does not decode packet headers for routing, and typically the details of transport network 110 are not accessible to routers and other devices in packet network 105.

FIG. 1 shows several example physical paths through transport network 110. For example, path O1 transits optical nodes B, D, and F via transport links 190, 155, 170, and 195. Path O2 transits optical nodes B, F, G, and E via transport links 185, 150, 175, 180, and 195. Path O3 transits optical nodes C, D, G, and E via transport links 190, 155, 165, 180, and 195. Path O4 transits optical nodes B, F, D, and E via transport links 185, 150, 160, 170, and 195. Each of these paths can be referred to as a transport segment. The various transport links 145, 150, 155, 160, 165, 170, 175, 180, 185, 190, and 195 each may have different characteristics, and accordingly, transport segments O1, O2, O3, and O4 each may have different characteristics. These characteristics can include latency, bandwidth, reliability, or security characteristics, for example. Routers 115 and 130 can advertise the available optical paths O1, O2, O3, and O4 to the packet network 105 as different transport segments using labels. For example, router 115 advertises O1, O2, O3, and O4 to routers 135 and 120, router 130 advertises O1, O2, O3, and O4 to router 140. Router 120 and/or router 140 may advertise O1, O2, O3 and O4 to router 125. The process can continue until all nodes in the packet network (i.e., packet network 105) have topological information about the transport network (i.e., transport network 110), including transport segments.

An application transmitting packets over packet network 105, for example over a path which includes link L from router 115 to router 130, can leverage the advertised segments to indicate a preference for certain transport characteristics. For example, if path O1 has a particular low latency, and path O2 has a particular high reliability but higher latency, an edge router of the transport segment routing enabled network can push (i.e., append) a label corresponding to O1 onto a packet to indicate a preference for the low latency path, or can push a label corresponding to O2 to indicate a preference for the high reliability path. The edge router may determine the suitable transport segment characteristic using a deployment specific mechanism. For example, the edge router may receive this information from a network device 197, which may include a path computation element (PCE), a network controller or some embedded logic that receives topological updates about the network. A network controller can include a centralized entity configured to receive information about different transport paths and/or segments, and can use this information to create different paths having different characteristics. The network controller has knowledge of the topology of the network and can compute best paths through the network. A PCE can include a device that computes paths with constraints in the network. In either case, network device 197 can be centralized, having a view of the entire network administrative domain over which it has control. The network device 197 (e.g., edge router logic, PCE, or the network controller) may obtain the topological update information by participating in appropriate protocols that flood information about the topology of the network. Packet flooding is a computer network routing algorithm in which every incoming packet is sent through every outgoing link except the link on which it arrived. This label is used by the transport links 145, 150, 155, 160, 165, 170, 175, 180, 185, 190, and 195 to route the packet over the appropriate transport segments through transport network 110.

Figure 2:
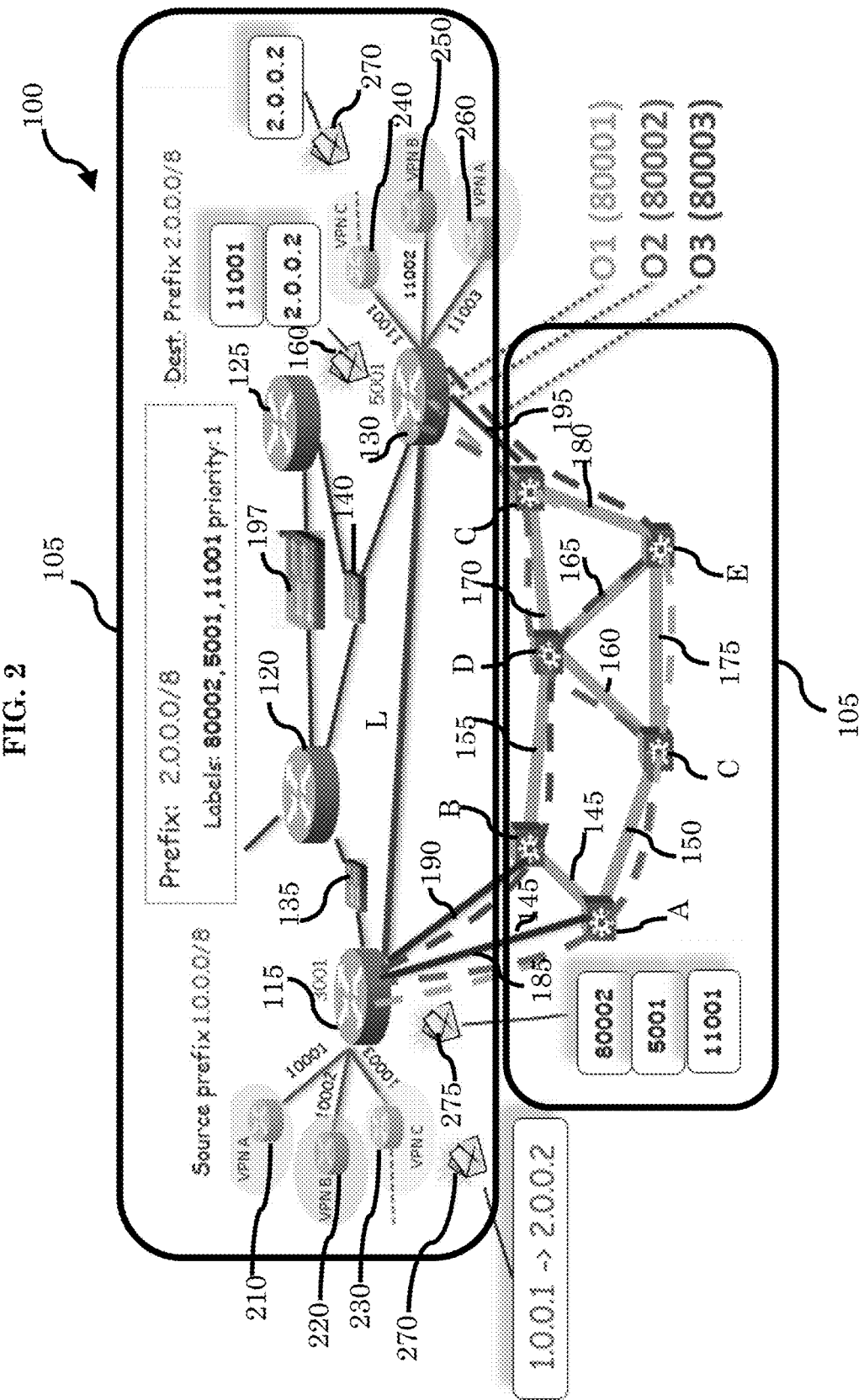
FIG. 2 is a system diagram showing further aspects of the example topology of FIG. 1.

FIG. 2 is a system diagram showing further aspects of example topology 100. FIG. 2 includes endpoints for VPNA, VPNB, and VPNC, which are in communication with routers 115 and 130 over links in packet network 105. These endpoints include edge routers 210, 220, 230, 240, 250 and 260 for the transport switching enabled network, behind which are endpoints for VPNA, VPNB, and VPNC. Packet transmission over a virtual private network (VPN) tunnel is used here as an example that uses the mapping service, however any service could use the mapping service to resolve destination.

In order to transmit a packet via VPNA, VPNB, or VPNC over logical link L with particular transport characteristics, the transport segments are each given a label in the packet domain so that they can be added to the packet header to direct the packet through transport network 110 along a particular segment. A mapping device providing a mapping service can be implemented to map packet domain endpoints (e.g., VPNA, VPNB, or VPNC in FIG. 1). A mapping device can include, for example, a server running on one or more of the POG devices (e.g., router 115 and router 130 in the example of topology 100) or any other suitable mapping device at any suitable point in the packet network to match transport segment labels to end point location addresses that are usually identified by IP addresses.

In order to map the transport segments to the end points, the mapping server acquires information about edge domains with which it is in communication. This process by which the mapping service obtains this information can be referred to as "end point discovery." The mapping server can discover the edge domains to which it is connected, assign a site ID to each edge domain, and discover end point addresses (e.g., Internet Protocol (IP), Media Access Control (MAC), label, or other segment identifier) in each of the edge domains using any appropriate packet domain discovery technique. For example, the mapping server can receive this information from an edge router of one or more edge domains to which it is in communication, either by requesting the information or receiving it automatically, periodically, or in the course of other communications. The edge router can learn this information and communicate it to the mapping server. The mapping server can maintain a mapping between end point addresses and the corresponding transport segments or segment identifiers. The mapping server can assign the site ID to each edge domain via configuration. In some implementations, the mapping server derives the site ID based on other configured information, such as Open Shortest Path Flow (OSPF) area, Autonomous System (AS) number, etc.

In the context of FIG. 2, a mapping server implemented on router 130 may solicit IP prefixes for edge domains served by edge routers 210, 220, 230, 240, 250 and 260. It is noted that this location of the mapping server is an example, and that the mapping server can be located at any suitable point in the transport segment routing enabled network. Alternately or additionally, the mapping server implemented on router 130 may receive IP prefixes for the edge domains automatically and/or periodically from the by edge routers 210, 220, 230, 240, 250 and 260.

The mapping server also acquires information about transport segments with which it is in communication. The process by which the mapping service obtains this knowledge can be referred to as transport segment routing discovery. The mapping server can discover active segments in the TSR domain (e.g., transport network 110) using any appropriate transport domain discovery technique. For example, the mapping service can receive this information from a network device 197, either by requesting the information or receiving it automatically, periodically, or in the course of other communications.

The mapping server also acquires information regarding the mapping of end point addresses to transport segment labels or segment IDs. The mapping server can receive this information from a network device 197. The mapping can include, for example, a correspondence of an IP prefix to a particular transport segment for a particular transport characteristic. The mapping server maintains a database of end-points or services and associated transport segments. The mapping server can provide transport segments used to reach a given end-point from an ingress router, and can provide different transport segments to reach the same end-point having different characteristics.

The edge router of each of the edge domains (or any server leveraging TSR) maintains a routing information base (RIB or routing table) and a forwarding information base (FIB or forwarding table). The routing table is a data table stored in or for the edge router that lists routes to particular network destinations. The forwarding table is a data table stored in or for the edge router that is used to determine to which interface an input interface should forward a packet. In order for the edge router to push a label for a transport segment over which (or with which transport segment characteristic) a particular packet or packets should be transmitted, each of these tables must include relevant label information, such as a label stack. The edge router obtains this information from the mapping server.

Several possible implementations for updating edge router routing and/or forwarding tables are possible. In a first case, which can be referred to as a proactive scenario, an edge router can be pre-programmed with an IP to transport segment mapping. For example, the forwarding table of the edge router can be programmed with a label stack corresponding to a particular destination prefix. This mapping may be pre-programmed in any suitable manner, for example, based on a conversational history or network policy. It is noted that an end point may have several end point addresses. Each end-point may provide different types of services, each of which requires or can benefit from a different characteristic. Each one of these characteristics can be represented by a transport segment, and the transport segment can be used to satisfy the service characteristic.

In a second case, which can be referred to as a reactive scenario, an appropriate mapping for a destination address is not pre-programmed or otherwise resident in the routing table or forwarding table of the edge router. In this case, the edge router can query the mapping service to obtain a list of segments corresponding to the end point address for a particular transport characteristic.

In a third case, the edge router can be updated via a hybrid of proactive and reactive techniques. For example, the forwarding and routing tables might be updated proactively or reactively depending on the frequency of appropriate messaging from the mapping service.

Changes to end point addresses, their location, segments, or labels, or mappings of end-point addresses to segments can be updated by the mapping service in any suitable way. For example the mapping server can update this information whenever an end-point address or segment is changed or removed. Changes to end point addresses, their location, or corresponding labels or label stacks can be obtained by the mapping server by polling or otherwise interfacing with edge devices and/or the PCE or network controller. The mapping server can then push any updates to the forwarding tables or routing tables of affected edge routers (i.e., proactively) or can provide this information to edge routers upon request (i.e., reactively). Any suitable algorithm can be used to purge entries from the forwarding and/or routing tables of the edge routers (e.g., aging-based, usage-based, or priority based).

In the example of FIG. 2, three different transport segments, O1, O2, and O3, are advertised using labels or segment IDs 80001, 80002, and 80003 respectively. Each of these transport segments may have different characteristics. In this example, O1 can carry information with relatively low latency, O2 can carry information with relatively high reliability, and O3 can carry information with a relatively high throughput.

A mapping server implemented on router 130 performs packet domain discovery and discovers packet network links to edge routers 210, 220, 230, 240, 250 and 260, as well as router 115. The mapping server also obtains corresponding segment IDs for these links and nodes; in this case, 10001, 10002, 10003, 11001, 11002, 11003, and 5001 respectively. The mapping server performs transport domain discovery to acquire topological information about transport segments O1, O2, and O3, and obtains corresponding segment IDs for these links (in this case, 80001, 80002, and 80003 respectively.)

The mapping server also acquires a mapping of endpoints on the edge domains to transport segments (e.g., from a PCE or network controller). In this example, the mapping server learns that an endpoint at IP address 1.0.0.1 exists on the edge network served by edge router 230, and that an endpoint at IP address 2.0.0.2 exists on the edge network served by edge router 240 via packet domain discovery. The mapping server also obtains label stacks for a transport path to 2.0.0.0/8, (the prefix for edge router 240 which serves the end point at 2.0.0.2). In this example, the label stack (covering the TSR part of the stack) is 80002, 5001, 11001, which indicates a segment routed path through both the packet network 105 and the transport network 110.

In this example, the endpoints at IP addresses 1.0.0.1 and 2.0.0.2 are endpoints of virtual private network VPNC. If a client of VPNC at 1.0.0.1 transmits a packet 270 indicating a destination of IP address 2.0.0.2, edge router 230 determines whether the necessary information is contained in its routing and forwarding tables. In the reactive case, upon receiving the packet from the client at 1.0.0.1, the edge router can request a label stack corresponding to 2.0.0.0/8, the prefix for edge router 240 (which serves the end point at IP address 2.0.0.2), from the mapping server on router 130. The mapping server returns the label stack 80002, 5001, 11001, specifying a high-reliability label-switched path through both the packet network 105 and the transport network 110. In the proactive case, the edge router will already have been provided with the label stack.

Edge router 230 then pushes the label stack onto packet 270 to create labeled packet 275, and transmits labeled packet 275 to router 115 which is a POG. Router 115 transmits the packet over transport network 110 via high reliability transport segment O2 based on label 80002, which is at the top of the label stack. Transport segment O2 includes the path over transport links 185, 150, 160, 170, and 195, and transport nodes A, C, D, and F respectively to router 130. Each of transport nodes A, C, D, and F routes the packet along segment O2 based on label 80002.

Router 130 receives labeled packet 275 and pops label 80002 off of the label stack to create packet 280. Router 130 then forwards packet 280, with its popped label stack, to edge router 240 based on label 11001 (now at the top of the stack). Edge router 240 then pops label 11001 to recover packet 270, and transmits packet 270 to the endpoint at IP address 2.0.0.2.

In some implementations the transport segments may be prioritized. For example, if segments O1 and O2 were to have substantially the same characteristics, a higher priority could be assigned to O1 than to O2. In this case, packets mapped to O1 for transport are re-routed by any node in the transport network to transport segment O2 in the event that segment O1 loses connectivity.

Figure 3:
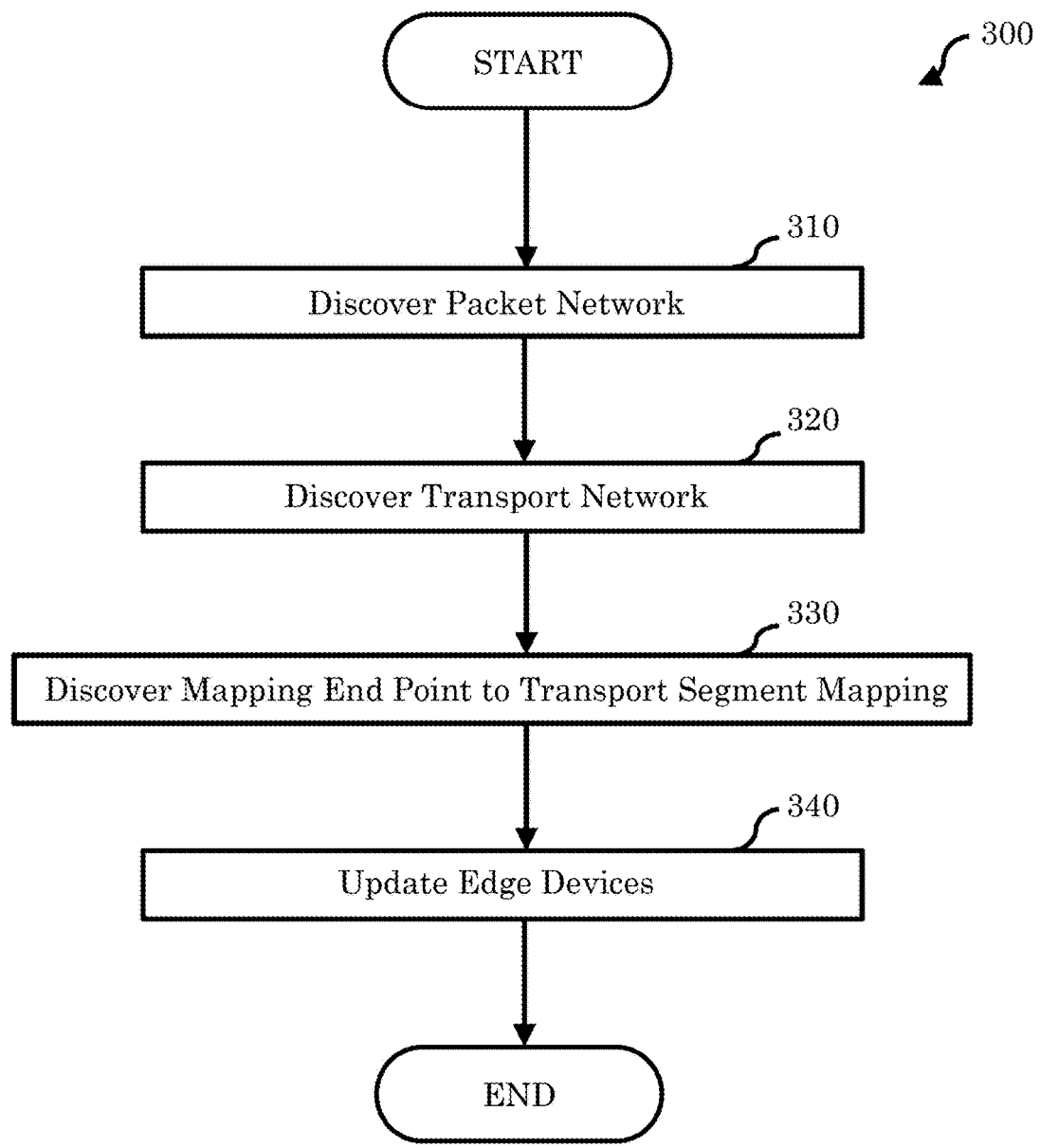
FIG. 3 is a flow chart illustrating an example method for mapping transport segments to packet network end points.

FIG. 3 is a flow chart illustrating an example method 300 for mapping transport segments to packet network end points. Method 300 is usable with any suitable network topology, such as topology 100 as shown and described with respect to FIGS. 1 and 2. The order of these steps is exemplary, and they can be rearranged as appropriate. Further, certain steps may be omitted or performed by other devices, or additional steps may be added. Method 300 can facilitate dynamic binding between packet network endpoints and transport segments in a way that mitigates the amount of end-point or service to segment mapping state that needs to be maintained on each edge router.

In step 310, a mapping server performs packet network discovery. The mapping server acquires information about edge domains with which it is in communication. The mapping server can discover the edge domains with which it is in communication, assign a site ID to each edge domain, and discover network prefixes and/or end point addresses in each of the edge domains using any appropriate packet domain discovery technique, e.g., by receiving it from edge routers with which it is in communication.

In step 320, the mapping server performs transport network discovery. The mapping server acquires information about transport segments to which it is in communication. The mapping server can discover active segments in the TSR domain (e.g., transport network 110) using any appropriate transport domain discovery technique, e.g., by receiving it from a PCE or network controller.

In step 330, the mapping server discovers end point address mapping to transport segment labels. The mapping server can discover mappings using any appropriate discovery technique, e.g., by receiving it from a PCE or network controller.

In step 340, the mapping server updates edge devices. The mapping server can transmit mappings relevant to each edge device proactively, or reactively using any suitable updating mechanism. For example, the mapping server can transmit the mappings when they are updated, or when they are requested by one or more edge devices.

Figure 4:
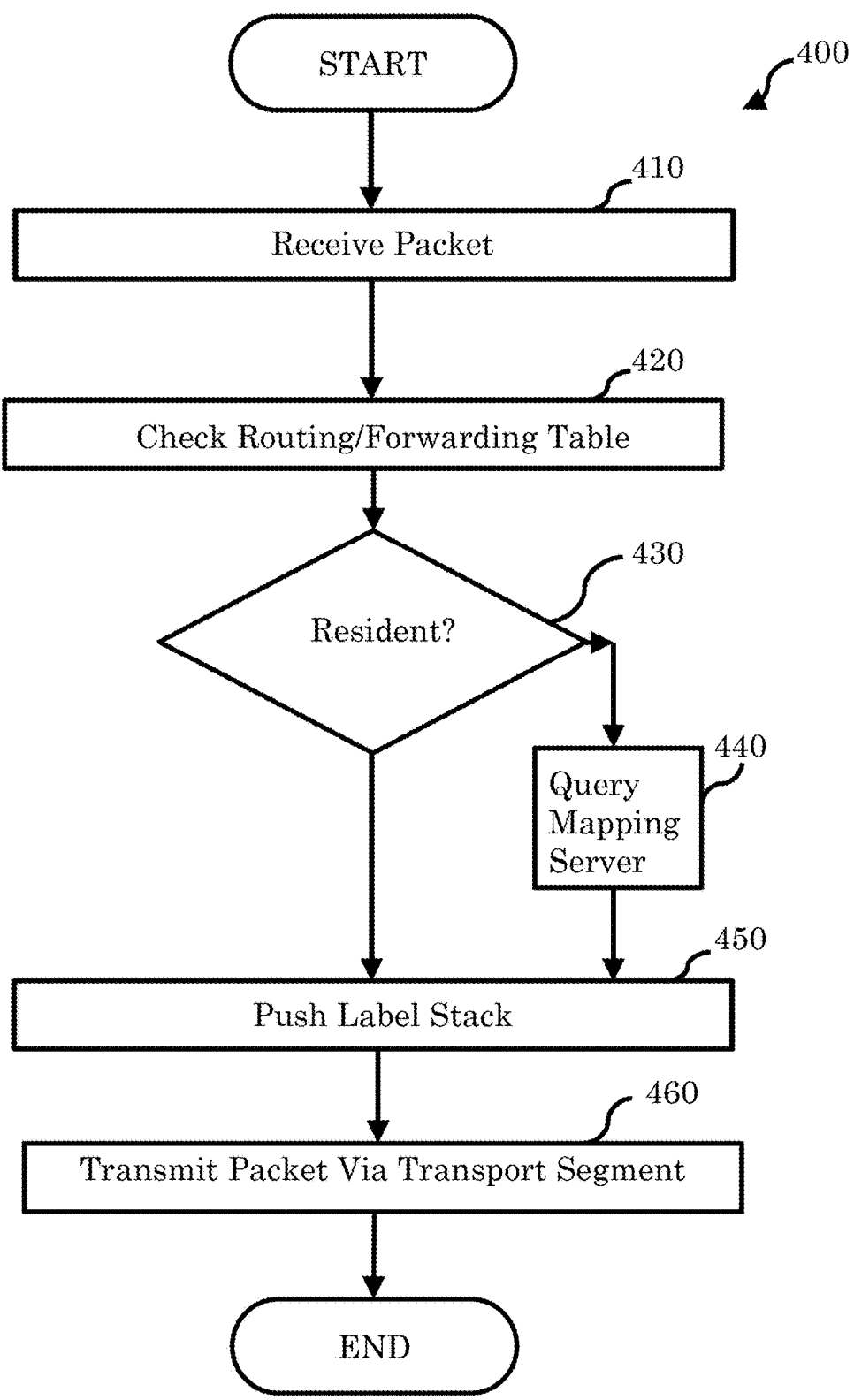
FIG. 4 is a flow chart illustrating an example method for transmitting a packet over a transport network using transport segment routing and a mapping server.

FIG. 4 is a flow chart illustrating an example method 400 for transmitting a packet over a transport network using transport segment routing and a mapping server. Method 400 is usable with any suitable network topology, such as topology 100 as shown and described with respect to FIGS. 1 and 2. The order of these steps is exemplary, and they can be rearranged as appropriate. Further, certain steps may be omitted or performed by other devices, or additional steps may be added.

In step 410, a transport segment routing network edge router receives a packet. The packet may be received from any suitable source, such as an endpoint in a packet switched network in communication with the edge router. The packet has a source and destination address, such as an IP address. In step 420, the edge router checks its routing and/or forwarding tables to determine if the packet destination has a mapping to a label stack for TSR.

On a condition 430 that a routing and/or forwarding tables include a suitable label stack, the edge device pushes the label stack onto the packet in step 450. Otherwise, the edge device updates its routing and/or forwarding tables by querying an appropriate mapping server in step 440 before pushing the label stack in step 450. In step 460, the edge router transmits the packet according to the routing indicated in the label stack such that the packet follows a route which includes a transport segment as indicated by the label stack.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
receiving, from an edge router of a packet-based network, an end point address in an edge domain of the packet-based network;
receiving, from a first device of the packet-based network, a mapping of a transport segment to the end point address, the transport segment being provided in a transport network, the transport network including nodes that do not perform packet header decoding for routing;
storing the mapping in a non-transitory memory device; and
on a condition that a request for the mapping is received from a second network device of the packet network, transmitting the mapping to the second network device, said transmitting the mapping including transmitting a packet, the packet including a header, the header including first and second labels in a packet domain, the first label including a first segment identifier that identifies a first segment, and the second label including a second segment identifier that identifies a second segment, the first segment being the transport segment and the second segment being another transport segment provided in the transport network.

2. The method of claim 1, wherein the first and second segments have first and second priorities, respectively.

3. The method of claim 1, wherein the first label corresponds to a characteristic of the first segment.

4. The method of claim 3, wherein the characteristic comprises at least one of a bandwidth, a latency, a throughput, a reliability, a link protection a node protection, or a security.

5. The method of claim 1, wherein the first device comprises a packet computation element (PCE) or a network controller.

6. The method of claim 1, further comprising transmitting the mapping in response to receiving an update request from the router.

7. The method of claim 1, further comprising transmitting the mapping in response to receiving an indication that a routing segment has been added or modified.

8. The method of claim 1, further comprising communicating with the first device to receive information regarding the transport segment.

9. The method of claim 1, further comprising communicating with a network device to receive information regarding at least one link of the transport network.

10. A mapping server comprising:
transceiver circuitry configured to communicate with at least one edge router of a packet-based network and receive an end point address in an edge domain from the edge router;
the transceiver circuitry further configured to communicate with at least a first network device of the packet-based network and to receive a mapping of a transport segment to the end point address, the transport segment being provided in a transport network, the transport network including nodes that do not perform packet header decoding for routing;
memory circuitry configured to store the mapping in a non-transitory memory device; and
the transceiver circuitry further configured to transmit the mapping to a second network device on the packet network on a condition that a request for the mapping is received from the second network device, said transmitted mapping being provided in a packet, the packet including a header, the header including first and second labels in a packet domain, the first label including a first segment identifier that identifies a first segment and the second label including a second segment identifier that identifies a second segment, the first segment being the transport segment and the second segment being another transport segment provided in the transport network.

11. The mapping server of claim 10, wherein the first and second segments have first and second priorities, respectively.

12. The mapping server of claim 10, wherein the first label corresponds to a characteristic of the first segment.

13. The mapping server of claim 12, wherein the characteristic comprises at least one of a bandwidth, a latency, a throughput, a reliability, a link protection, a node protection, or a security.

14. The mapping server of claim 10, wherein the first device comprises a packet computation element (PCE) or network controller.

15. The mapping server of claim 10, wherein the transceiver circuitry transmits the mapping in response to receiving an update request from the edge router.

16. The mapping server of claim 10, wherein the transceiver circuitry transmits the mapping in response to receiving an indication that a routing segment has been added or modified.

17. The mapping server of claim 10, wherein the transceiver circuitry is further configured to communicate with the first device to receive information regarding the transport segment.

18. The mapping server of claim 10, wherein the transceiver circuitry is further configured to communicate with a network device to receive information regarding the transport network.

19. The mapping server of claim 10, wherein the edge domain has an associated site identifier (ID), the memory circuit further storing the site ID.

* * * * *